(12) United States Patent
Sandhu

(10) Patent No.: US 8,612,383 B2
(45) Date of Patent: Dec. 17, 2013

(54) METHOD AND SYSTEMS FOR CACHING OBJECTS IN A COMPUTER SYSTEM

(75) Inventor: Mandeep S. Sandhu, O'Fallon, MO (US)

(73) Assignee: MasterCard International Incorporated, Purchase, NY (US)

(*) Notice: Subject to any disclaimer, the term of this patent is extended or adjusted under 35 U.S.C. 154(b) by 886 days.

(21) Appl. No.: 12/265,543

(22) Filed: Nov. 5, 2008

(65) Prior Publication Data
US 2010/0114919 A1 May 6, 2010

(51) Int. Cl.
G06F 7/00 (2006.01)
G06F 17/00 (2006.01)

(52) U.S. Cl.
USPC ........................................... 707/610

(58) Field of Classification Search
USPC .................................. 707/755, 609
See application file for complete search history.

(56) References Cited

U.S. PATENT DOCUMENTS

| | | | |
|---|---|---|---|
| 5,261,069 A | 11/1993 | Wilkinson et al. | |
| 6,266,742 B1 | 7/2001 | Challenger et al. | |
| 6,408,311 B1* | 6/2002 | Baisley et al. | 1/1 |
| 6,453,360 B1 | 9/2002 | Muller et al. | |
| 6,633,891 B1* | 10/2003 | Bamford et al. | 1/1 |
| 7,130,964 B2 | 10/2006 | Ims et al. | |
| 7,318,074 B2 | 1/2008 | Iyengar et al. | |
| 7,360,025 B1* | 4/2008 | O'Connell et al. | 711/133 |
| 7,581,066 B2* | 8/2009 | Marwinski et al. | 711/129 |
| 7,856,530 B1* | 12/2010 | Mu | 711/119 |
| 2002/0107881 A1* | 8/2002 | Patel | 707/500 |
| 2003/0158947 A1* | 8/2003 | Bloch et al. | 709/227 |
| 2004/0153576 A1* | 8/2004 | Hansmann et al. | 709/248 |
| 2005/0131962 A1* | 6/2005 | Deshpande | 707/201 |
| 2005/0160396 A1* | 7/2005 | Chadzynski | 717/103 |
| 2006/0248088 A1* | 11/2006 | Kazar et al. | 707/10 |
| 2006/0248124 A1* | 11/2006 | Petev et al. | 707/201 |
| 2008/0065644 A1 | 3/2008 | Pasupuleti et al. | |
| 2010/0257137 A1* | 10/2010 | Bullon et al. | 707/623 |

OTHER PUBLICATIONS

International Search Report and Written Opinion, PCT/US2009/58450, Nov. 9, 2009, (7 pages).

* cited by examiner

*Primary Examiner* — Robert Beausoliel, Jr.
*Assistant Examiner* — Michael Pham
(74) *Attorney, Agent, or Firm* — Armstrong Teasdale LLP

(57) ABSTRACT

Methods, systems, and computer programs embodied on computer readable media are provide for caching data within a cluster computing system using a cache adapter. A cache configuration file is stored within a computer system in the cluster computing system and includes information identifying a data replication application. The cache configuration file is received at a cache manager operating at the computer system and is subsequently parsed by the cache manager. An object is received from an application within the computer system and communicated to the data replication application based on the information parsed from the cache configuration file.

29 Claims, 7 Drawing Sheets

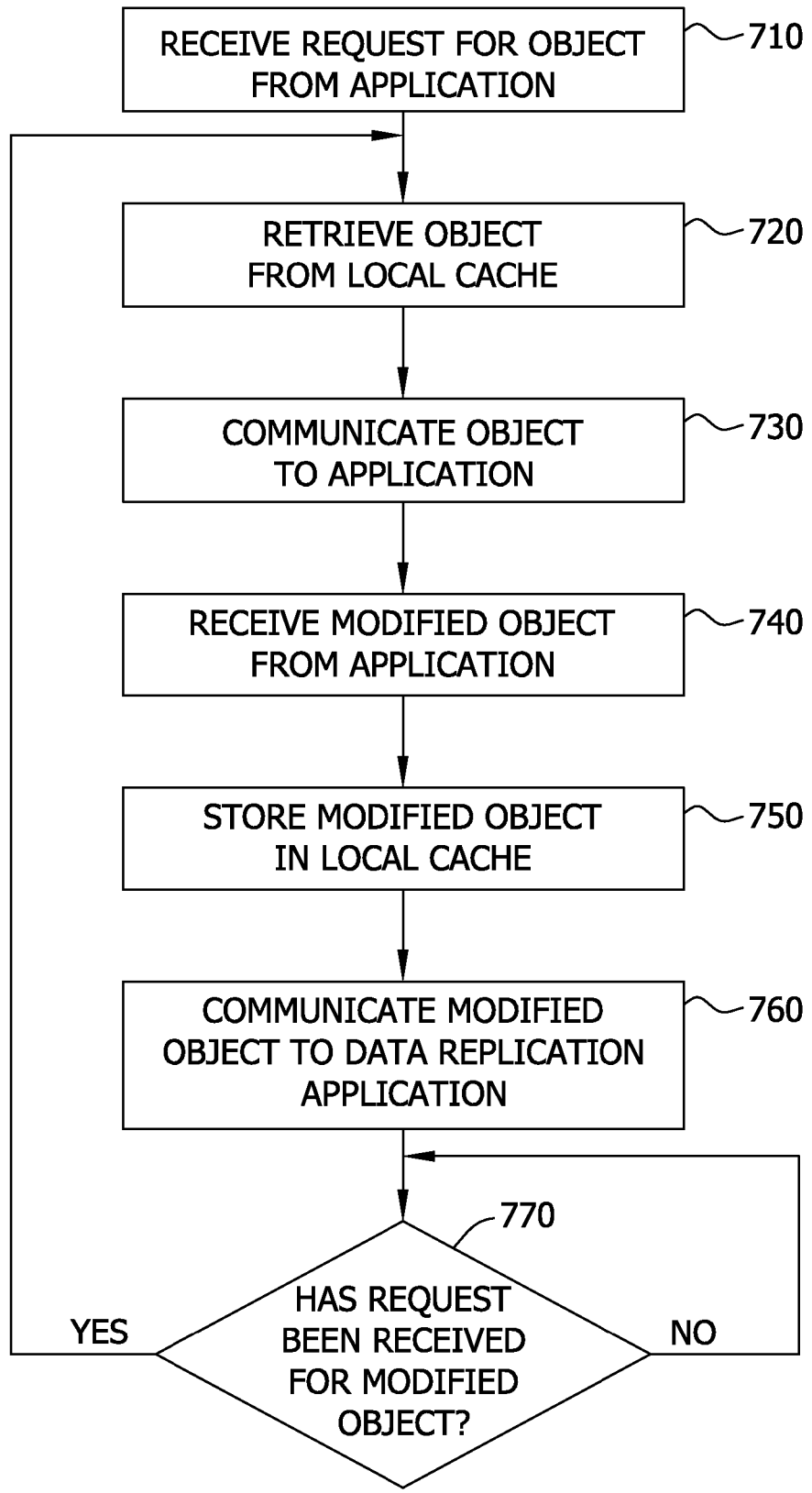

METHOD AND SYSTEMS FOR CACHING OBJECTS IN A COMPUTER SYSTEM

BACKGROUND OF THE INVENTION

This invention relates generally to a method and system for caching objects in a computing system, and more particularly to a cache adapter that provides a generic interface between applications operating within a cluster computing system and data replication applications also operating within the cluster computing system.

A cache is a collection of objects stored in a temporary storage area. The objects are duplicates of original objects that are stored elsewhere. Substantial time and computing resources are often required to retrieve the original objects from their storage locations compared to the time needed to retrieve the object from the cache's temporary storage area. The cache expedites the access of the collection of objects stored therein. A variety of methods are used to determine which objects to store in a cache and the duration of their stay.

In cluster computing systems, a group of computers are linked together through a network to generally function as a single computer. An application operating within the cluster computing system may receive input from a plurality of the computers in the cluster computing system. Accordingly, objects cached on one computer in the cluster often need to be distributed and cached on other computers in the cluster to maintain consistency.

A variety of data replication applications are available to facilitate the distributed caching of objects within the cluster. These applications differ from each other in the type and format of information required to interact with the data replication application. As such, the applications operating within the cluster must be modified to interact with a specific data replication application. Once an application has been modified to utilize a particular data replication application, significant time and resources are required to adapt the application to utilize a different data replication application or an updated version of the particular data replication application.

Accordingly, an adapter configured to function as an intermediary between applications operating within a cluster computing system and data replication applications also operating within the cluster computing system. The adapter should be easily configurable to allow implementation of different versions of the same data replication application or different data replication applications. In such a system, operators of the cluster computing system should be able to easily integrate data replication applications.

BRIEF DESCRIPTION OF THE INVENTION

In a first aspect, a method for caching data within a cluster computing system using a cache adapter is provided. The cluster computing system includes a plurality of computer systems coupled in communication. The method comprises storing a cache configuration file within a first computer system included within the cluster computing system, the cache configuration file including information identifying a data replication application. The cache configuration file is received at a cache manager operating at the first computer system and is parsed by the cache manager. At least one object is received from an application operating within the first computer system. The at least one object is communicated to the data replication application based on the information parsed from the cache configuration file.

In another aspect, a system for caching data within a cluster computing system using a cache adapter is provided. The cache adapter is stored within a first computer. The cluster computing system includes the first computer coupled to at least one other computer. The first computer is configured to store a cache configuration file, the cache configuration file including information identifying a data replication application. The first computer is configured to receive the cache configuration file at a cache manager, and parse the cache configuration file at the cache manager. The first computer is configured to receive at least one object from the application operating within the first computer and communicate the at least one object to the data replication application based on the information parsed from the cache configuration file.

In another aspect, a cache adapter system is provided for caching data within a cluster computing system. The cluster computing system including a plurality of computers in communication with one another. A cache configuration file is stored within a first computer included within the cluster computing system. The cache configuration file includes information identifying a data replication application. A cache manager operating at the first computer is also provided and is configured to receive the cache configuration file, parse the cache configuration file, and receive at least one object from an application operating within the first computer. The cache manager is further configured to communicate the at least one object to a data replication application based on the information parsed from the cache configuration file.

In another aspect, a computer program embodied on a computer readable medium for caching data within a cluster computing system using a cache adapter is provided. The cluster computing system includes a plurality of computer systems coupled in communication. The computer program comprises at least one code segment that stores a cache configuration file within a first computer system included within the cluster computing system, the cache configuration file including information identifying a data replication application. The computer program also includes at least one code segment that receives the cache configuration file at a cache manager operating at the first computer system, parses the cache configuration file, receives at least one object from the application operating within the first computer system, and communicates the at least one object to the data replication application based on the information parsed from the cache configuration file.

BRIEF DESCRIPTION OF THE DRAWINGS

FIG. 7 is a flow diagram illustrating a method of utilizing a cache adapter and corresponding configuration file in accordance with another embodiment of the present invention.

DETAILED DESCRIPTION OF THE INVENTION

Figure 1:
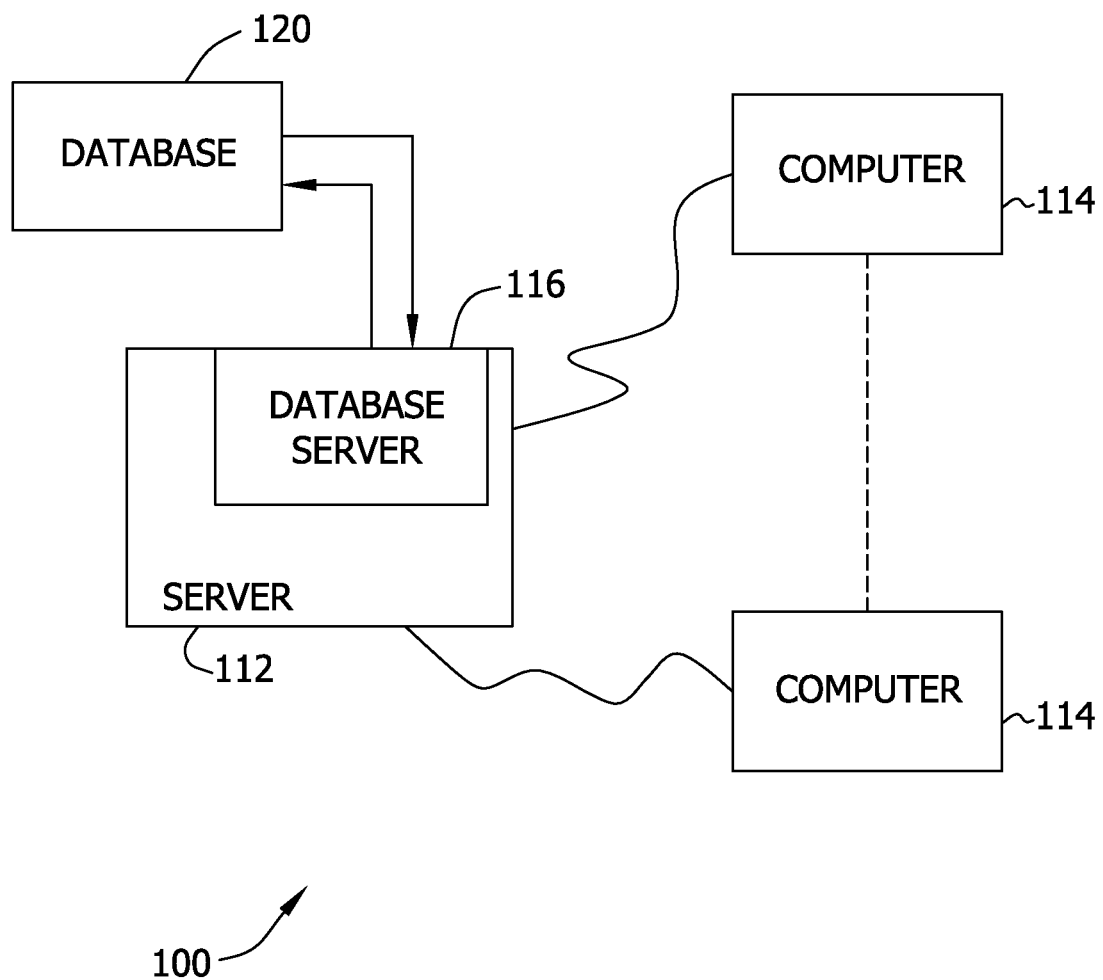
FIG. 1 is a simplified block diagram of an exemplary embodiment of a server architecture of a system in accordance with one embodiment of the present invention.

The described embodiments define systems and methods that utilize a cache adapter to enable an application operating within a cluster computing system to utilize different data replication applications without modifying the application. The described embodiments include extracting specific functions within an application that interact with a data replication application, and providing a cache adapter to define the information necessary for the interaction of the application and the data replication application. In addition, the described embodiments are further configured to support a variety of different data replication applications and configured to support newly developed data replication applications. In some embodiments, the cache adapter utilizes an XML (Extensible Markup Language) file which may be edited by a user (e.g., a software developer). The XML file defines the structure of the interactions between the application and the data replication application. In some embodiments, a document type definition (DTD) file defines the acceptable format of the XML file.

As used herein, the term "cache adapter" is defined to include both a cache manager and a cache configuration file. The cache manager is an application that interacts with both an application operating within the cluster computing system and a data replication application operating within the cluster computing system. As described herein, the cache configuration file includes information defining how the cache manager interacts with the application and the data replication application. According to one embodiments, the cache manager may reside in a .JAR lava archive) file or similar type library file, and subsequently be incorporated or compiled into an application. In some embodiments, other supporting components are included in the .JAR or library file along with the cache manager.

In cluster computing systems, individual computers are linked together in a network to generally function as a single computer. Cluster computing systems exhibit redundancy and are easily scalable, while being more cost-effective than a single computer of equivalent computing power. Each of the individual computers included within a cluster computing system is sometime referred to as a node. Each of the individual nodes of a cluster computing system usually maintains its own corresponding local cache residing thereon.

Applications operating within the cluster computer system, hereinafter "cluster", will often utilize different nodes to accomplish different tasks. The nodes, while performing different tasks, will operate upon objects and consequently modify, create, and delete the objects. The objects may be stored in the local cache of a plurality of nodes. For example, a first node may interact and modify objects that are required for use by a second node, and vice versa.

The content of the local caches of the respective nodes may become inconsistent. For instance, when a user (e.g., either a regular human user or another application) modifies an object contained in a node's local cache it is then inconsistent with the contents of the other nodes' local caches. Data replication applications (DRAs) have been developed by a variety of vendors to synchronize the local caches of the nodes in a cluster with one another. Examples of DRAs are IBM's Websphere® Dynamic Cache (Websphere is a registered trademark of International Business Machines Corporation, Armonk, N.Y.) and Sun Microsystems' JAVA® Message System (JAVA is a registered trademark of Sun Microsystems, Inc, Santa Clara, Calif.).

Applications interact with a DRA to aid in maintaining the consistency of the local caches on each of the nodes. Upon receiving a notification from an application that a change has occurred in a local cache (e.g., a modification, addition, or deletion of an object stored therein) the DRA functions as a data replication service by modifying each of the other local caches to maintain their consistency relative to one another.

A variety of DRAs manufactured by different vendors are available, and each requires different information to be provided to it by the application in different formats. Applications therefore must be designed to interact with a particular DRA. Modifying an application to interact with a DRA (e.g., an updated version of the same DRA or an altogether different DRA produced by a different vendor) that is different than it was originally intended to interact with is both time-consuming and costly as changes must be made to the application's source code.

The embodiments described herein relate to methods and systems that utilize a cache adapter to enable an application operating within a cluster computing system to utilize different data replication applications without modifying the application. The cache adapter acts as an intermediary between the DRA and the application, and is configured to manage the interaction of the application with the DRA. The application need not contain the functionality required to interact with the DRA.

At least one technical effect of the systems and processes described herein involves the use of a cache adapter within a cluster computing system. The cache adapter includes both a cache manager and a cache configuration file. The process begins with the setup of the cache configuration file. The cache configuration file is then received and parsed by a cache manager. The cache manager receives an object that is to be cached from an application operating within the cluster computing system and subsequently communicates it to a data replication application operating within the cluster computing system based on the information contained in the configuration file. The cache manger also stores the object in a local cache. The cache manger subsequently receives a request for the object from the application and communicates the object to the application. The application may modify the object and communicate it back to the cache manger. The cache manger then stores the modified object in the local cache and communicates it to the data replication application. This process repeats each time the object is modified by the application.

The system and processes are not limited to the specific embodiments described herein. In addition, components of each system and each process can be practice independent and separate from other components and processes described herein. Each component and process also can be used in combination with other assembly packages and processes.

FIG. 1 is a simplified block diagram of an exemplary system 100 in accordance with one embodiment of the present invention. In one embodiment, system 100 is a cluster computing system. More specifically, in the example embodiment, system 100 includes a server system 112, and a plurality of client sub-systems, also referred to as client systems or nodes 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Figure 2:
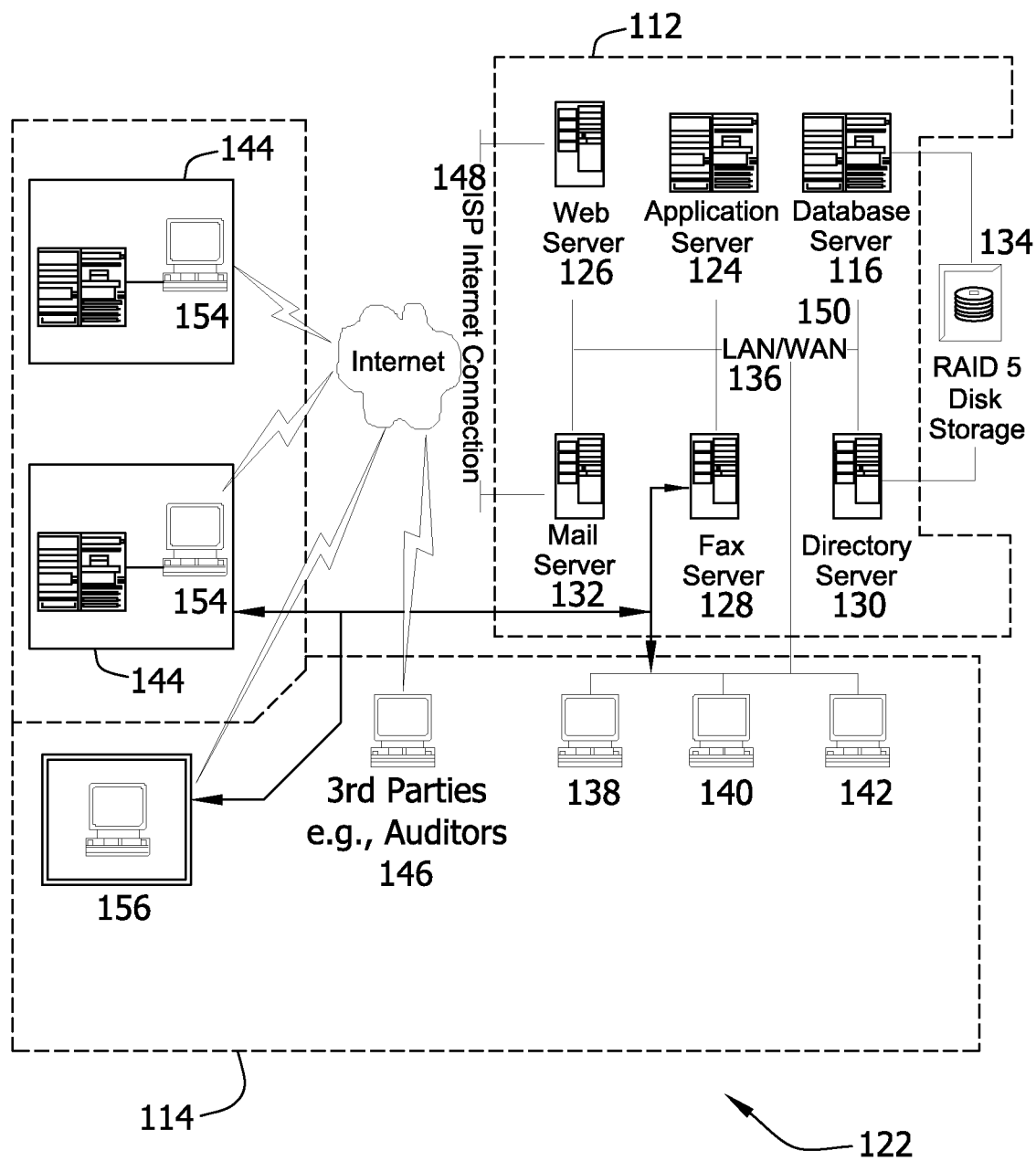
FIG. 2 is an expanded block diagram of an exemplary embodiment of a server architecture of a system in accordance with one embodiment of the present invention.

FIG. 2 is an expanded block diagram of an exemplary embodiment of a server architecture of a system 122 in accordance with one embodiment of the present invention. Components in system 122, identical to components of system 100 (shown in FIG. 1), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., auditors, 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

The systems and processes described herein include removing from the application the functionality required to interact directly with the DRA. Under previous systems, applications were adapted to function with a particular DRA. As different DRAs require applications to interact with them in dissimilar ways and provide them with information in different formats, an application adapted to work with one particular type of DRA will often not function with another different type of DRA. Accordingly, an application must be modified to utilize the different DRA. A user may chose a different DRA in a variety of scenarios, including, but not limited to: replacing a current version of a DRA with an updated version or implementing a DRA supplied by a different vendor.

Under the previous system described above, in order to utilize a different DRA the application must be modified. This often requires hard-coding of the instructions necessary to interact with the different DRA into the application at the expense of significant cost, time, and other resources.

In the exemplary embodiment, a cache adapter is provided that acts as intermediary between the application operating within the cluster computing system and the DRA operating within the cluster computing system. The cache adapter includes both a cache manager and a cache configuration file. The cache adapter contains the necessary instructions and functionality to interact with a variety of DRAs. Accordingly, as new or updated DRAs become available, only the cache adapter need be updated to ensure compatibility and not the application, thus significantly reducing the time and cost of implementing the DRAs.

In some embodiments, the cache adapter may be a standalone application residing on each node. While in other embodiments, the cache manager's source code can be compiled along with the application's source code to integrate the functionality of the cache adapter into the application. In the embodiments described herein, particular reference is made to instances where the cache adapter functions as a standalone application.

A configuration file is used in conjunction with the cache manager, together forming the cache adapter. In some embodiments, a configuration file is maintained for each application operating within the cluster at each node that the application is utilizing. Accordingly, if two applications are operating within a cluster of four nodes, and each of the applications is utilizing all of the nodes, eight configuration files are provided. The configuration file contains, by way of example only, information describing the name of the objects to be cached, the frequency that the objects are to be refreshed to determine if they have been modified, and the identity of the particular DRA that is to be utilized. The configuration file may be a text file in a format (e.g., XML) that is easily edited by a user (e.g., a software developer). Each node may have a corresponding configuration file residing thereon, or these configuration files may be stored in a centralized location. In embodiments utilizing an XML-formulated configuration file, a DTD file is often used to verify the syntax and contents of the XML file to ensure that it contains the required information in the proper format.

An exemplary configuration file is presented below as Table 1 and a corresponding DTD file is presented in Table 2. While this configuration file only contains entries relating to a single object that is to be cached, in other embodiments multiple entries are included in the configuration file detailing the properties of multiple objects that are to be cached. The entries associated with one object are provided herein for the sake of brevity and clarity.

TABLE 1

Cache Configuration File

<?xml version="1.0" encoding="UTF-8"?>
<!DOCTYPE cache-config SYSTEM "CacheFramework.dtd">
<cache-config description="" refresh-multiplier="10" cache-implementation-
class="com.cacheframework.cache.CacheWebsphereDistImpl" dist-cache-
jndi-name="GbcmCache">

TABLE 1-continued

Cache Configuration File

```
<cache-entry key="gbcm.properties" refresh-interval="0">
<source type="file">
<source-file path="/apps_config/gbcm/config/gbcm/gbcm.prd.properties"
store="properties"/>
</source>
</cache-entry>
<cache-entry key="gbcm.obj.list.allActiveDeliverables" refresh-
interval="1800">
<source type="class">
<source-class
name="com.mastercard.inet.gbcm.service.InputCollectionService" bean-
name="inputCollectionService" instance="spring" main-context="main-
context">
<method name="getAllActiveDeliverables"></method>
</source-class>
</source>
</cache-entry>
</cache-config>
```

TABLE 2

Cache Configuration File XML DTD

```
<?xml version="1.0" encoding="UTF-8"?>
<!ELEMENT cache-config (cache-entry+)>
<!ELEMENT cache-entry (source)>
<!ELEMENT source (source-class|source-file)>
<!ELEMENT source-file EMPTY>
<!ELEMENT source-class (method)>
<!ELEMENT method (parameter*)>
<!ELEMENT parameter (#PCDATA)>
<!ATTLIST parameter name CDATA #REQUIRED>
<!ATTLIST parameter type CDATA #REQUIRED>
<!ATTLIST parameter value CDATA #REQUIRED>
<!ATTLIST method name CDATA #REQUIRED>
<!ATTLIST source type (file|class) #REQUIRED>
<!ATTLIST source-class name CDATA #REQUIRED>
<!ATTLIST source-class instance (new|singleton|spring) "new">
<!ATTLIST source-class bean-name CDATA #IMPLIED>
<!ATTLIST source-class main-context CDATA #IMPLIED>
<!ATTLIST source-file path CDATA #REQUIRED>
<!ATTLIST source-file store (properties|bundle) #REQUIRED>
<!ATTLIST cache-entry refresh-interval CDATA "0">
<!ATTLIST cache-entry key CDATA #REQUIRED>
<!ATTLIST cache-config description CDATA #IMPLIED>
<!ATTLIST cache-config refresh-multiplier CDATA "0">
<!ATTLIST cache-config cache-implementation-class CDATA
#REQUIRED>
<!ATTLIST cache-config dist-cache-jndi-name CDATA #IMPLIED>
```

As mentioned above, the DTD file depicted in Table 2 defines the proper syntax and format required of the information contained in the cache configuration file depicted in Table 1. The cache adapter uses the DTD file while parsing the cache configuration file to determine if the configuration file contains the proper information in the correct syntax. If the configuration file does not contain the proper information in the correct syntax, the cache adapter may reject the configuration file and issue an error message. The operation of XML and DTD files and associated parsers is understood by those skilled in the relevant art.

The cache configuration file depicted in Table 1 is an XML document with various configuration properties (interchangeably referred to as "properties"). The configuration properties in Table 1 are in no way meant to be exclusive. To the contrary, a variety of different configuration properties can be used in the cache configuration file. The DTD file depicted in Table 2 defines the required contents (i.e., configuration properties) and syntax of the cache configuration file depicted in Table 1. Furthermore, the DTD file defines whether or not a property is required to be provided in the cache configuration, and if so what the accepted values are for the property. Additionally, the DTD file provides a default value for the properties that are required to be present in the cache configuration file.

Accordingly, the DTD file depicted in Table 2 and the cache configuration file presented in Table 1 and described below are merely illustrative, and should not be construed to limit the scope of the described embodiments. Additionally, the cache configuration file need not be an XML document.

The first group of configuration properties presented in Table 1 is the "cache-config" group. Included in this group are the following configuration properties: description, refresh-multiplier, cache-implementation-class, and dist-cach-jndi name. The description property provides a description of the project and does not have to be provided. The refresh-multiplier relates to the refresh-interval described more fully below and simply functions as multiplier of the refresh-interval. For example, when a refresh-interval is specified at 10 seconds, but the system requires 2 seconds to update and create the cache, then the cache adapter sets the value of the refresh multiplier as the product of 10 and 2 (i.e., 20). This value is not required, and when not provided the cache adapter assumes a default value of 10. The cache-implementation-class property is the wholly qualified name of the cache implementation class (i.e., the name of the DRA). This property must be provided in the configuration file as it conveys to the adapter the type of DRA that it must communicate with.

The second group of configuration properties is the "cache-entry" group. Included in this group are the following configuration properties: key and refresh-interval. The key property is name of the cache object through which the object will be referenced and is required. The refresh-interval property specifies the refresh period of the cache in seconds or fractions thereof. A value of zero indicates that the cache should not be refreshed. In Table 1, the unit of time is milliseconds, and the value of "1800" is equal to 1.8 seconds. A value for this property need not be provided according to some embodiments.

The third group of configuration properties is the "source" group. Included in the "source" group are the "source-file" and "source-class sub-groups. The type configuration property is included in the source group, while the path and store configuration properties are include in the "source-file" sub-group. The "source-class" sub-group include the name, instance, bean-name, and main-context configuration properties.

The type configuration property specifies the source of the file, with acceptable values being "file"—indicating to load the cache from the properties file and "class"—indicating to load the outcome of the class file. A value for this property is required. The path property specifies the path of the properties file and is required according to this embodiment. The store configuration property defines how to store the key-value pair from the properties file a corresponding value is also required.

The name property defines the fully qualified name of the class file to be invoked and is required. The instance property specifies how to create the instance of the class to be invoked, with acceptable values being: new, singleton, and spring. The default value is 'new'. The bean-name property is required for spring beans, and simply specifies the name of the spring bean. The main-context property is required for spring beans only and specifies the main context name.

The fourth group is the "method" group which contains the name configuration property. The name property is the name of the method to be invoked, and is consequently required.

The fifth group is the "parameter" group, included in which are the name, type, and value configuration properties. Each of the properties in the "parameter" group define what their respective titles imply; with the name property defining the name of the parameter, the type property defining the type of the parameter, and the value property defining the actual value of the parameter to be passed.

Figure 3:
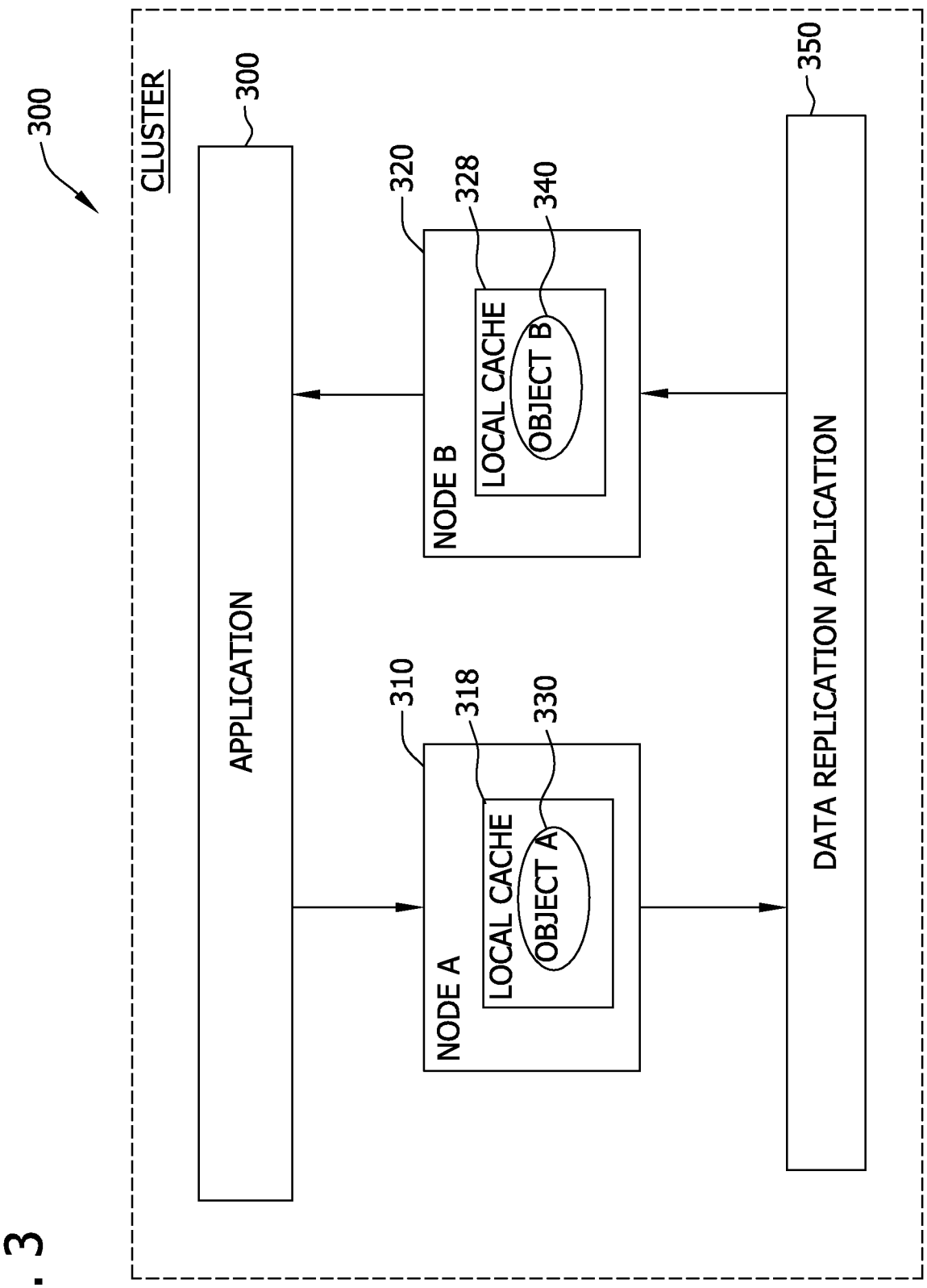
FIG. 3 is a simplified block diagram of a known cluster computing system and corresponding data replication application.

FIG. 3 illustrates a simplified block diagram of a known cluster computing system and corresponding data replication application. The depiction in FIG. 3 is that of a known system that required direct communication between an application operating within a cluster computer system and a data replication application operating within the cluster computer system.

Included in the clustered computing system, referred to in FIG. 3 as cluster 300, are node A 310, node B 320, and a data replication application (DRA) 350. Included within node A 310 is a local cache 318, while node B 320 includes a local cache 328. Within each local cache 318 and 320 is an object A 330 and an object B 340, respectively.

While two nodes 310 and 320 and one application 302 are depicted in FIG. 3, it should be understood that different numbers of nodes or applications are often implemented in previous systems.

While an application 302 is shown in FIG. 3 as being separate from the nodes 310 and 320, it may reside on either one or both nodes. Application 302 interacts with the object A 330 and object B 340 and routinely modifies object A or B. Object A 330 and object B 340 contain the same information, and it is therefore desirable to maintain consistency between the two. For example, object A 330 and object B 340 may contain information describing an address of a customer, and the nodes 310 and 320 may be terminals used by customer service representatives. The application 302 is then a database application that permits the representatives of the respective nodes 310 and 320 to modify, among other things, the address of the customer. In this example, the address of the customer is maintained in object A 330 and object B 340. Accordingly, a representative interacting with node A 310 may modify object A 330 to reflect a change in the address of the customer. It is therefore desirable to update object B 340 to reflect this change in the customer's address.

The DRA 350 is communicatively coupled (e.g., through a network) to the nodes 310 and 320, and in turn to the application 302. The application 302 communicates with the DRA 350 regarding objects that it stores and retrieves from the local caches 318 and 328. When the application modifies the object A 330 or object 340, it notifies the DRA 350 of the event and provides a modified copy of the object to the DRA. The DRA 350 then reconciles the contents of the local caches 318 or 328.

Returning to the customer address example described above, the DRA 350 serves to ensure that data contained in object A 330 and object B 340 are consistent with each other. When object A 330 is modified (e.g., the customer's address is changed), it is communicated by the application 302 to the DRA 350 which in turn modifies the object B 340 so that it contains the same content as object A.

As the application 302 interacts directly with the DRA 350, it must be configured to interact with the particular type of DRA (e.g., Websphere or JMS). Accordingly, if a different type of DRA 350 is to be utilized in the cluster 300, the application 302 must be appropriately modified to maintain compatibility with the DRA. In instances where a plurality of applications are utilized in the cluster 300, updating each of them to ensure compatibility with a different type of DRA is time-consuming and costly.

Figure 4:
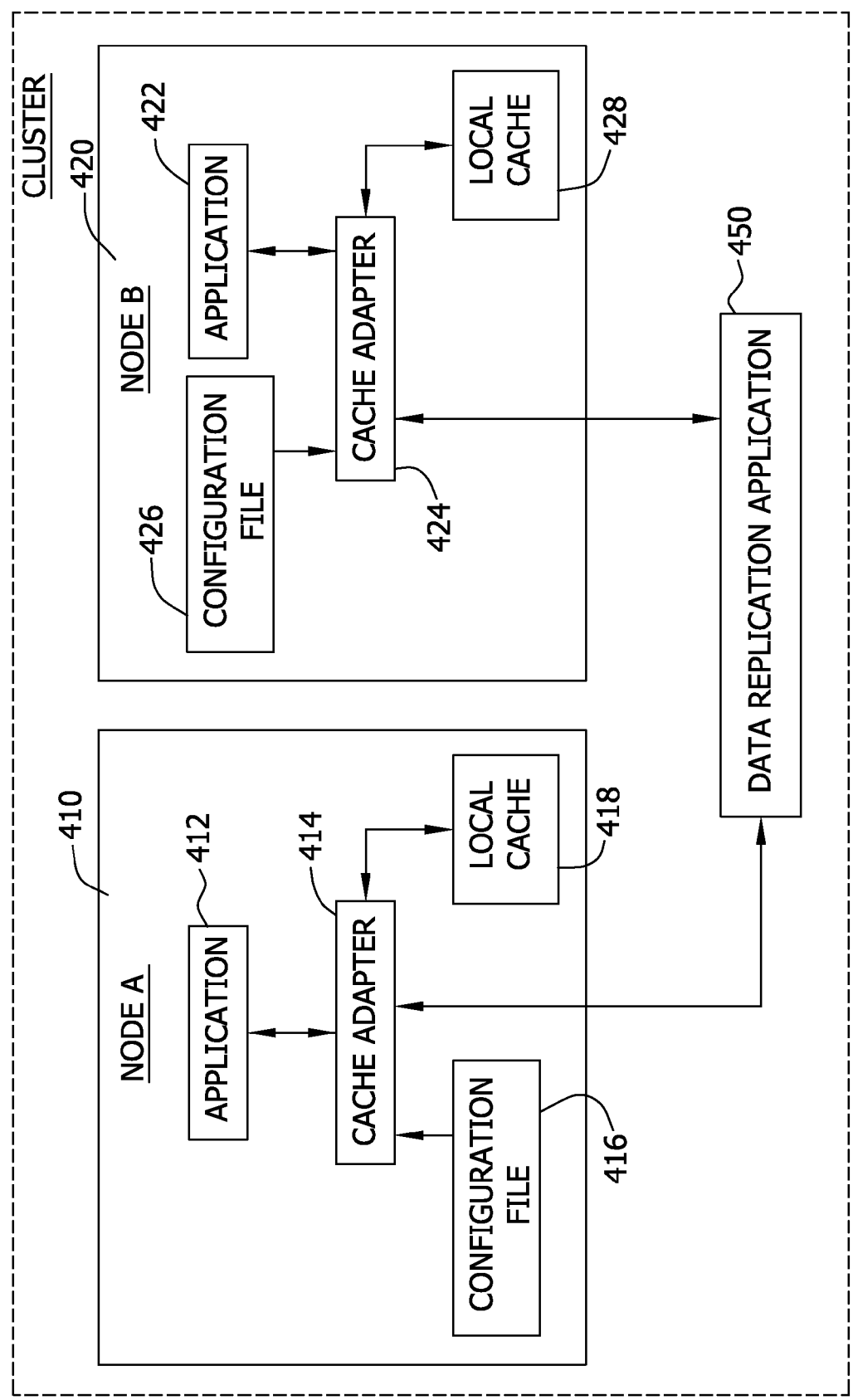
FIG. 4 is a simplified block diagram of an exemplary cluster computing system in accordance with one embodiment of the present invention.

FIG. 4 illustrates a simplified block diagram of an exemplary clustered computing system in accordance with an embodiment of the present invention. This particular clustered computing system depicts an implementation of the cache adapter into a system using IBM's Websphere® Dynamic Cache or other similar system.

Included in the cluster computing system, referred to in FIG. 4 as cluster 400, are: node A 410, node B 420 (collectively referred to as nodes 410 and 420), and a Data Replication Application (DRA) 450. It should be understood that the cluster 400 may contain any number of nodes or applications and that the number of nodes and application depicted is not intended to limit the scope of the embodiments.

Node A 410 includes an application 412, a cache adapter 414 having a configuration file 416, and a local cache 418. Node B 420 likewise includes an application 422, a cache adapter 424 having a configuration file 426, and a local cache 428. Included in the applications 412 and 422 are instructions for interacting with the respective cache adapters 414 and 424. The instructions are simple in nature, and typically comprise one command that defines how to transfer (i.e., put into cache) an object to the respective cache adapter 414 or 424, and another command defining how to extract or get (i.e., retrieve from cache) an object. Exemplary instructions for interacting with the respective cache adapters 414 or 424 are: CacheManager.cacheEntry("keyName") for transferring an object to a respective cache adapter and CacheManager.getObjectFromCache("keyName") for retrieving the object from the respective cache adapter. In both exemplary instructions, "keyName" is the name of the object. Similar instructions are used in other embodiments of the invention for applications to communicate with the cache adapter. In the example embodiments presented herein the cache adapters 414 and 424 also includes corresponding cache managers (not shown).

In the embodiment depicted in FIG. 4, the applications 412 and 422 running on nodes 410 and 420 are different instances of the same application (e.g., a database application), although it should be understood that it need not be the case as different applications may be present on the nodes without departing from the scope of the embodiments. Further, multiple applications may operate on the nodes 410 and 420 in the cluster 400 without departing from the scope of the embodiments.

The respective cache adapters 414 and 424 of the nodes 410 and 420 are communicatively coupled (e.g., by a network) both to each other, respectively and to the DRA 450. The DRA 450 may reside on a stand alone node (not shown) or on any other computing device within the cluster 400. The operation of the DRA 450 and the cache adapters 414 and 424 will be described below in relation to FIGS. 6 and 7.

Figure 5:
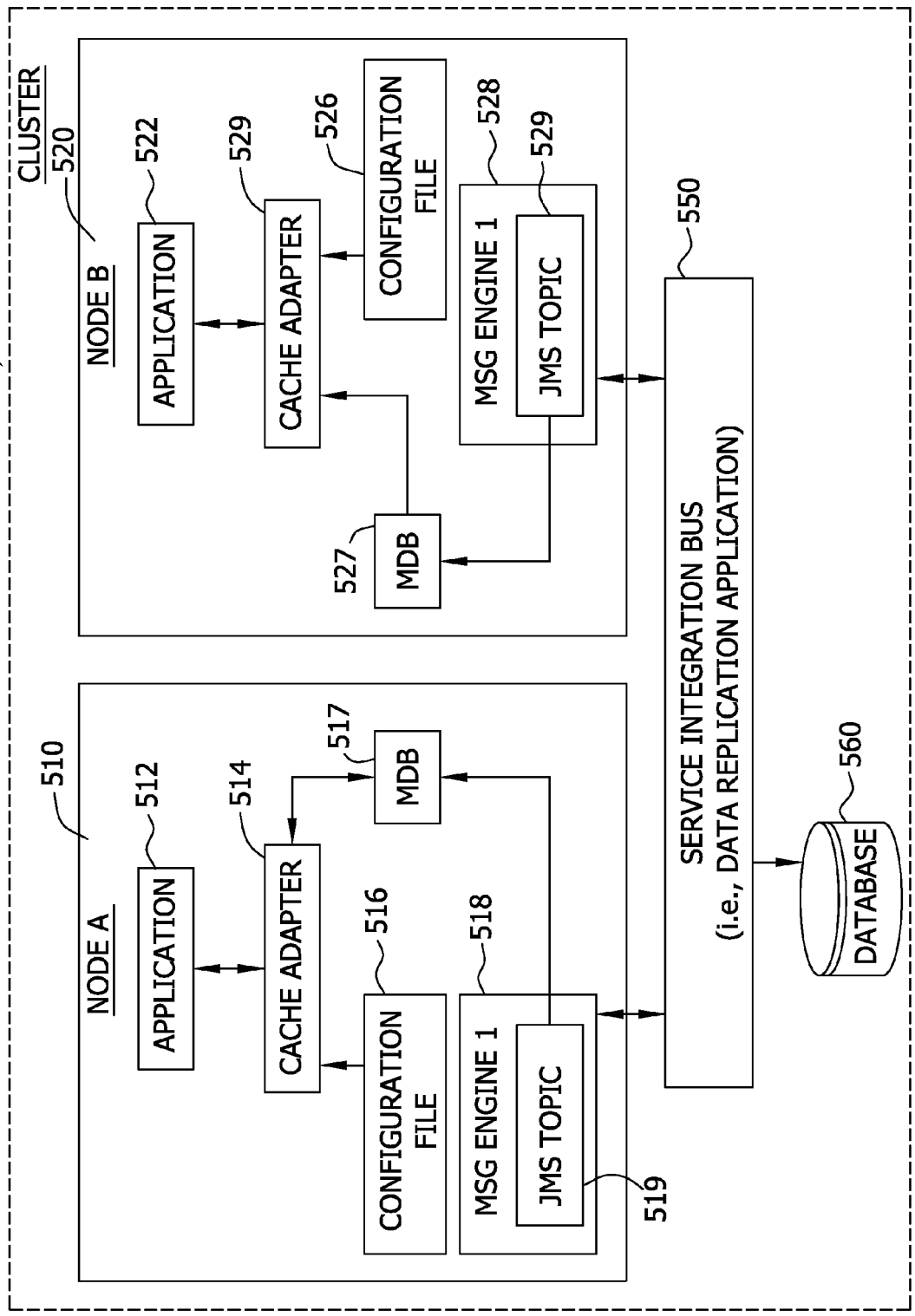
FIG. 5 is a simplified block diagram of an exemplary cluster computing system in accordance with one embodiment of the present invention.

FIG. 5 illustrates a simplified block diagram of an exemplary cluster computing system in accordance with an alternative embodiment of the present invention. This particular clustered computing system depicts an implementation of the cache adapter into a system using Sun Microsystems® JAVA Message Service (JMS) or other similar system.

Included in the cluster computing system, referred to in FIG. 5 as cluster 500, are: node A 510, node B 520 (collectively referred to as nodes 510 and 520), and a Data Replication Application (DRA) 550. It should be understood that the cluster 500 may contain any number of nodes or applications and that the depiction of two nodes and two applications therein is not intended to limit the scope of the embodiments.

Node A 510 includes an application 512, a cache adapter 514 having a configuration file 516, MDB 517 (message-driven bean), MSG engine 518, and JMS topic 519. Node B 520 likewise includes an application 522, a cache adapter 524 having a configuration file 526, MDB 527 (message-driven bean), MSG engine 528, and JMS Topic 529. In the example embodiments presented herein the cache adapters 514 and 524 also include corresponding cache managers (not shown).

Included in the applications 512 and 522 are instructions for interacting with the respective cache adapters 514 and 524. The instructions are simple in nature, and typically comprise one command that defines how to transfer (i.e., put into cache) an object to the respective cache adapter 514 or 524, and another command defining how to extract or get (i.e., retrieve from cache) an object. Exemplary instructions for interacting with the respective cache adapters 514 or 524 are: CacheManager.cacheEntry("keyName") for transferring an object to a respective cache adapter and CacheManager.getObjectFromCache("keyName") for retrieving the object from the respective cache adapter. In both exemplary instructions, "keyName" is the name of the object.

In the embodiment depicted in FIG. 5, the applications 512 and 522 running on nodes 510 and 520 are different instances of the same application (e.g., a database), although it should be understood that need not be the case as different applications may be present on the nodes without departing from the scope of the embodiments. Further, multiple applications may operate on the nodes 510 and 520 in the cluster 500 without departing from the scope of the embodiments.

The respective cache adapters 514 and 524 of the nodes 510 and 520 are communicatively coupled (e.g., by a network) both to each other and the DRA 550. The DRA 550 may reside on a stand alone node (not shown) or on any other computing device within the cluster 500.

Figure 6:
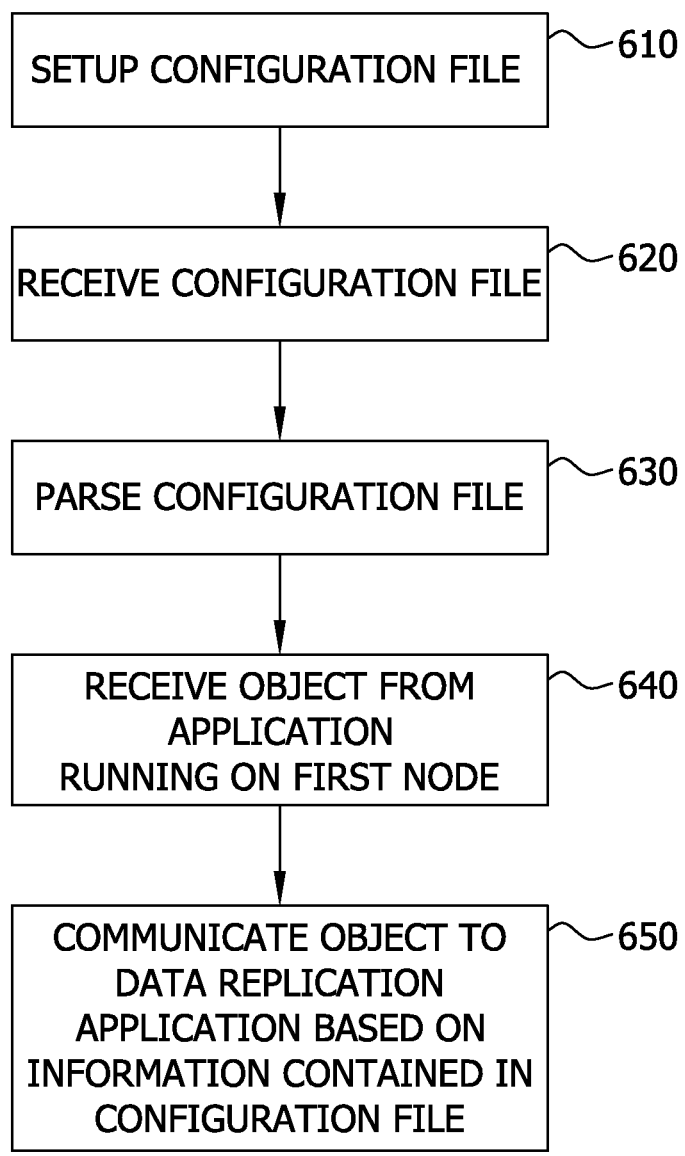
FIG. 6 is a flow diagram illustrating a method of utilizing a cache adapter and corresponding configuration file in accordance with one embodiment of the present invention.

FIG. 6 illustrates a flow diagram depicting a method of utilizing a cache adapter and corresponding configuration file in accordance with an embodiment of the present invention.

The method begins at block 610, with the setup of the cache configuration file. In some embodiments, the cache configuration file is in a text format, such as XML. Accordingly, a user (e.g., a software developer) is able to easily modify and create the configuration file. In addition, a configuration application may be used to guide the user in creating the configuration file by providing prompts for the user to provide the necessary information to create the configuration file. For example, the configuration application may prompt a user to provide the name of the DRA that is to be utilized, the class and key of the objects that are to be cached, and the corresponding refresh intervals of the objects. The configuration application may consult a DTD file that defines the types of information and corresponding syntax required for the cache configuration file. Upon successful reception of the information necessary to create the cache configuration file (as defined by the DTD file), the file is created. The file may be both created and stored on a node in the clustered computing system. Alternatively, the file may be created on another node or computer and transferred to the node.

The process detailed in block 610 is repeated in some embodiments for each application running on each node, as described more fully above. For the purposes of discussion relating to FIG. 6, it is assumed that one application is running on each node and the process is repeated for each node.

In block 620, the configuration file is received by the cache manage. According to some embodiments, this may occur substantially concurrently with the startup of the application. In embodiments where the configuration file is stored locally on the node, the cache adapter need only access the configuration file. In other embodiments, the configuration file may be stored on a node or other computer in the cluster and thus the cache adapter retrieves the configuration file from its storage location through a network or other communication method.

The configuration file is parsed by the cache manager in block 630. As discussed in relation to Tables 1 and 2 above, the configuration file contains properties defining information about the objects to be cached and the type of DRA utilized in the cluster. To parse the configuration file, the cache manager consults the corresponding DTD file to ensure that the cache configuration file contains the proper syntax and information as required by the DTD file. The cache manager is then able to determine the values associated with the various properties defined in the configuration file.

In block 640, an object is received by the cache manager from an application running on a first node. The application typically communicates the object to the cache manager so that the cache manager may in turn cache the object on the node's local cache. Accordingly, the cache adapter (i.e., the cache manager and cache configuration file) acts as an intermediary between the application and the node's local cache.

The cache manager communicates the object to a DRA in block 650 based on the information contained in the configuration file. As described above, the cache configuration file provides information detailing the interactions between the cache manager and the DRA. The DRA may reside on a node or other computing system in the clustered computing environment. The object is then communicated over a network to the DRA, according to some embodiments. After receiving the object, the DRA communicates it to the other nodes in the cluster according to the methods described above.

As described above, the cache adapter functions as an intermediary between the node's local cache and the DRA. The application does not include any instructions or code for interacting directly with the DRA. Accordingly, if a different DRA is used in the cluster, only the cache configuration file is modified, and not the application, to ensure compatibility with the different DRA.

FIG. 7 illustrates a flow diagram depicting a method of utilizing a cache adapter and corresponding configuration file in accordance with one embodiment of the present invention. The method described in FIG. 7 builds on the method described in FIG. 6 and includes the steps disclosed therein.

The method begins in block 710 with the reception of a request for an object from an application. The request is received by the cache manager. The request is often for an object that was previously communicated to the cache manager and subsequently stored in the local cache of the node. Upon receiving the request for the object, the cache manager consults the local cache to determine if the object is stored thereon.

In block 720, the cache manager retrieves the object from the local cache. The cache manager, according to some embodiments, consults the cache configuration file to determine the refresh interval of the object. The interval between the time that the object in the cache was last modified or updated and the current time of the request is determined. If this time period exceeds the fresh interval, the cache manager does not return the object, and instead requests the application to provide it with a copy of the object to store in the local cache and communicate to the DRA.

The cache manager communicates the object to the application in block 730. Upon receiving the object from the cache manager, the application typically performs an action (e.g., modifying) upon the object. In the customer address example, the object contains a customer's address and the modification performed thereon by the application is the updating of the address.

A modified version of the object is received by the cache manager from the application in block 740. In some embodiments, the application may not have modified the object, and accordingly a modified version of the object will not be received by the cache manager. This often occurs when the application merely requests the object to examine or view its contents, but does not modify the object. In these instances, the method would proceeds from block 730 to block 770.

The cache manager stores the modified version of the object in the local cache in block 750. As described above, the local cache is maintained on the node.

In block 760 the cache manager communicates the modified object to a data replication application (DRA). The DRA in turn communicates the modified object to other cache managers residing on other nodes in the cluster through the network connecting the nodes in the cluster. According to some embodiments, the steps recited in blocks 750 and 760 may occur at substantially the same point time or in reverse order without departing from the scope of the embodiments.

In decision block 770, the cache manager determines if a request has been received from the application for the modified object. If the request has not been received the method returns to blocks 770 and the cache manager waits for such a request. If the request has been received for the modified object, the method returns to block 720 and proceeds accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for caching data within a cluster computing system, the cluster computing system including a plurality of computer nodes coupled in communication, each computer node of the plurality of computer nodes including a cache manager, a local cache, and at least one application, said method comprising:
    storing a first cache configuration file within a first computer node included within the cluster computing system, the first cache configuration file comprising information defining a first communication format for communication with a data replication application;
    storing a document type definition (DTD) file within the first computer node, the DTD file defining an acceptable data format for the first cache configuration file;
    receiving the first cache configuration file at a first cache manager operating at the first computer node;
    parsing the first cache configuration file at the first cache manager to determine whether the first cache configuration file conforms to the acceptable data format and to enable the first cache manager to communicate with the data replication application according to the first communication format;
    receiving, at the first cache manager operating at the first computer node, a command according to a second communication format from an application operating within the first computer node, wherein the command is a command regarding a cache object; and
    communicating the cache object from the first cache manager to the data replication application according to the first communication format.

2. The method in accordance with claim 1, wherein parsing the first cache configuration file further comprises parsing computer-related instructions within the first cache configuration file, wherein the computer-related instructions instruct the first cache manager on a process for retrieving and updating objects stored within a first local cache at the first computer node.

3. The method in accordance with claim 1, wherein receiving the command further comprises receiving a write command, wherein the write command includes an updated version of the cache object at the first computer node, the updated version of the cache object including data different from data included within a previously received version of the cache object.

4. The method in accordance with claim 1, further comprising storing the cache object within a first local cache at the first computer node in response to receiving the command regarding the cache object.

5. The method in accordance with claim 4, further comprising replacing the cache object stored within the first local cache at the first computer node with an updated version of the cache object.

6. The method in accordance with claim 5, wherein replacing the cache object further comprises receiving the updated version of the cache object from the application operating within the first computer node.

7. The method in accordance with claim 6, further comprising communicating the updated version of the cache object to the data replication application according to the first communication format.

8. The method in accordance with claim 1, wherein the receiving a command regarding the cache object comprises:
    storing the cache object within a first local cache of the first computer node; and
    communicating the cache object stored within the first local cache of the first computer node to each local cache of each computer node within the cluster computing system, wherein the communicating is accomplished by the data replication application.

9. A cluster computing system comprising a first computer node coupled to at least one other computer node, the first computer node comprising:
    a first local cache;
    a first cache manager;
    a data replication application communicatively coupled to the at least one other computer node within the cluster computing system; and
    a processor configured to execute commands to:
    store a first cache configuration file in a memory device, the first cache configuration file comprising information defining a first communication format for communication with the first data replication application;
    store a document type definition (DTD) file within the first computer node, the DTD file defining an acceptable data format for the first cache configuration file;
    receive the cache configuration file at the first cache manager operating at the first computer node;
    parse the first cache configuration file at the first cache manager to determine whether the first cache configuration file conforms to the acceptable data format, the parsing enables the first cache manager to communicate with the data replication application according to the first communication format;

receive a command regarding a cache object according to a second communication format at the first cache manager operating at the first computer node from an application operating within the first computer node; and communicate the cache object from the first cache manager to the data replication application, including a transmission of the cache object according to the first communication format.

10. The cluster computing system in accordance with claim 9, wherein the processor is further configured to execute commands to parse computer-related instructions within the first cache configuration file, wherein the computer-related instructions instruct the first cache manager on a process for retrieving and updating objects stored within the first local cache at the first computer node.

11. The cluster computing system in accordance with claim 9, wherein the processor is further configured to execute commands to receive a command regarding the cache object that includes an updated version of the cache object received at the first computer node, the updated version of the cache object including data different from data included within a previously received version of the cache object.

12. The cluster computing system in accordance with claim 9, wherein the processor is further configured to execute commands to store the cache object within the first local cache at the first computer node.

13. The cluster computing system in accordance with claim 12, wherein the processor is further configured to execute commands to replace the cache object stored within the first local cache at the first computer node with an updated version of the cache object.

14. The cluster computing system in accordance with claim 13, wherein the processor is further configured to execute commands to receive the updated version of the cache object from the application operating within the first computer node.

15. The cluster computing system in accordance with claim 14, wherein the processor is further configured to execute commands to communicate the updated version of the cache object to the data replication application according to the first communication format.

16. The cluster computing system in accordance with claim 9, where the processor is further configured to execute commands to:
store the cache object within the first local cache of the first computer node; and
communicate the cache object stored within the first local cache of the first computer node to each local cache of each computer node within the cluster computing system, wherein the communication is accomplished by the data replication application.

17. A cache adapter system for caching data within a cluster computing system, the cluster computing system including a plurality of computer nodes in communication with one another, the cache adapter system comprising:
a processor configured to execute commands to:
store a first cache configuration file within a first computer node included within the cluster computing system, the first cache configuration file comprising information defining a first communication format for communication with a data replication application; and
store a document type definition (DTD) file within the first computer node, the DTD file defining an acceptable data format for the first cache configuration file; and
a first cache manager operating at the first computer node, the first cache manager configured to:
receive the first cache configuration file,
parse the first cache configuration file to determine whether the first cache configuration file conforms to the acceptable data format, the parsing enabling the first cache manager to communicate with the data replication application according to the first communication format;
receive a command regarding a cache object according to a second communication format from an application operating within the first computer node; and
communicate the cache object to the data replication application, including a transmission of the cache object according to the first communication format.

18. The cache adapter system in accordance with claim 17, wherein the first cache configuration file further comprises computer-related instructions instructing the first cache manager on a process to retrieve and update objects stored within a local cache at the computer node.

19. A non-transitory computer readable medium storing a computer program for caching data within a cluster computing system, the cluster computing system including a plurality of computer nodes coupled in communication, each computer node of the plurality of computer nodes including a cache manager, a local cache, and at least one application, the computer program comprising at least one code segment that, when executed by a processor, causes the processor to:
store a first cache configuration file within a first computer node included within the cluster computing system, the first cache configuration file comprising information defining a first communication format for communication with a data replication application operating at the first computer node;
store a document type definition (DTD) file within the first computer node, the DTD file defining an acceptable data format for the first cache configuration file;
receive the first cache configuration file at a first cache manager operating at the first computer node;
parse the first cache configuration file at the first cache manager to determine whether the first cache configuration file conforms to the acceptable data format, the parsing enabling the first cache manager to communicate with the data replication application according to the first communication format;
receive, at the first cache manager operating at the first computer node, a command regarding a cache object according to a second communication format from an application operating within the first computer node; and
communicate the cache object from the first cache manager to the data replication application, including a transmission of the cache object according to the first communication format.

20. The computer program in accordance with claim 19, further comprising at least one code segment that, when executed by a processor, causes the processor to parse computer-related instructions within the first cache configuration file, and wherein the computer-related instructions instruct the first cache manager on a process for retrieving and updating objects stored within a first local cache at the first computer node.

21. The computer program in accordance with claim 19, further comprising at least one code segment that, when executed by the processor, causes the processor to receive a write command regarding the cache object that includes an updated version of the cache object received at the first computer node, the updated version of the cache object including data different from data included within a previously received version of the cache object.

22. The computer program in accordance with claim 19, further comprising at least one code segment that, when executed by the processor, causes the processor to store the cache object within a first local cache at the first computer node.

23. The computer program in accordance with claim 22, further comprising at least one code segment that, when executed by the processor, causes the processor to replace the cache object within the first local cache at the first computer node with an updated version of the cache object.

24. The computer program in accordance with claim 23, further comprising at least one code segment that, when executed by the processor, causes the processor to communicate the updated version of the cache object to the data replication application according to the first communication format.

25. The computer program in accordance with claim 19, further comprising at least one code segment that, when executed by the processor, causes the processor to:
   store the cache object within a first local cache of the first computer node; and
   communicate the cache object stored within the first local cache of the first computer node to each local cache included at each computer node within the cluster computing system, wherein the communication is accomplished by the data replication application.

26. The method in accordance with claim 1, wherein storing the first cache configuration file further comprises information defining the cache object, and wherein parsing the first cache configuration file further comprises creating the cache object based at least in part on the information defining the cache object.

27. The system in accordance with claim 9, wherein the first cache configuration file further comprises information defining the cache object, and wherein parsing the first cache configuration file further comprises creating the cache object based at least in part on the information defining the cache object.

28. The cache adapter system in accordance with claim 17, wherein the first cache configuration file further comprises information defining the cache object, and wherein parsing the first cache configuration file further comprises creating the cache object based at least in part on the information defining the cache object.

29. The computer program in accordance with claim 19, further comprising at least one code segment that, when executed by a processor, causes the processor to store the first cache configuration file, wherein the first configuration file further comprises information defining the cache object, and at least one code segment that parses the first cache configuration file, the parsing further comprising creating the cache object based at least in part on the information defining the cache object.

* * * * *